INVENTOR.
ROBERT D. THOMPSON
STERLING W. ALDERFER
AND
ALFRED BOSSHARD

ATTORNEYS

Patented Feb. 24, 1953

2,629,678

UNITED STATES PATENT OFFICE 2,629,678

ARTIFICIAL LEATHER

Robert D. Thompson, Sterling W. Alderfer, and Alfred Bosshard, Akron, Ohio, assignors to Andrews-Alderfer Company, Akron, Ohio, a corporation of Ohio Application September 11, 1950, Serial No. 184,133

2 Claims. (Cl. 154—46)

The present invention relates to a new product which may be used as a substitute for leather and having certain advantages over former leather substitutes. The product may be used for inner soles and for table covering and upholstery. It has marked advantages over the older forms of artificial leather in that it is provided with a cushioning layer made of sponge rubber, preferably of foamed rubber latex. The top layer of the material is made of any of the various synthetic resins which have been recently developed and may be a polymer of vinyl chloride or a copolymer of vinyl chloride and other vinyl compounds. Pyroxylin or other synthetic resins or resin-like materials may likewise be used.

The yielding or cushioning layer is made of foamed latex and is attached to a layer of fabric, which is located between the sponge rubber layer and the upper or top layer of the synthetic resin. The layer of fabric interposed between the upper and lower layers is preferably of an open mesh and the sponge rubber is joined to the fabric layer by laying the fabric over a foamed mass of latex, brought to an even thickness before the foamed latex is vulcanized. In assembling the fabric and the foamed latex before it is set and vulcanized, the foamed latex penetrates into the interstices of the fabric so that the foamed latex and the fabric are firmly united and, after the sponged latex is cured, it is impossible to separate the fabric from the sponge rubber except by tearing the sponge rubber.

After the composite layer of rubber foam and fabric is vulcanized, the layer of synthetic resin is placed over the exposed surface of the fabric and is adhered to the fabric. It is possible to obtain a firm bond between the fabric and the layer of synthetic resin by several processes. The layer of synthetic resin may be spread on the surface of the fabric while in a plastic state and then fused by heat. A preformed sheet may be applied to the fabric by the use of an adhesive cement or by treating the under surface of the layer with a solvent so that adhesion is obtained with the fabric. In lieu of either of the above methods of applying the preformed sheet of synthetic resin, the under surface of the sheet may be softened by the application of heat and then applied to the exposed surface of the fabric layer, while the synthetic resin is soft and adhesive. In case the synthetic resin is spread upon the fabric side of the composite layer of sponge latex rubber, it will then be fused and set by heat, as is customary in the preparation of those materials. During this process, the outer surface of the synthetic resin layer may be embossed. If the synthetic layer is preset before it is attached to the fabric, it may first be treated to form an embossed, polished or decorative surface thereon.

The essence of the invention resides in the interposition of a layer of fabric between the layer of synthetic resin and the sponge rubber layer. Foamed latex will not adhere to a sheet of synthetic resin but by the interposition of the layer of fabric perfect adhesion is accomplished. This is due to the fact that the sponge rubber layer is thoroughly embedded and anchored in the meshes of the fabric and there is no difficulty in adhering the synthetic resin layer to the fabric.

Figure 1:
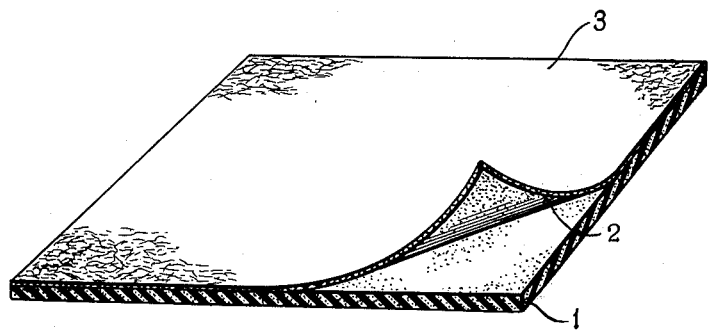
Fig. 1 is a view showing the finished product.
Figure 2:
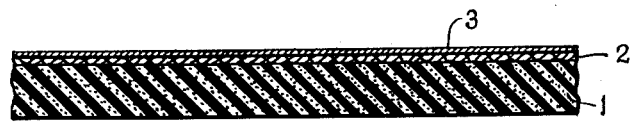
Fig. 2 is an enlarged cross section.

In the drawings the layer or element of sponge rubber is indicated by the numeral 1. As stated above, this is made from foamed latex, which is spread to an even thickness and then set and vulcanized. This layer may be of any desired thickness, depending upon the use to which the product is placed. When the product is to be used as an insole, the layer of sponge rubber may be as thick as ¼ of an inch. When used for table tops or for upholstery, the layer of rubber may be thinner.

The layer of fabric indicated at 2 may be of a lightly woven material, such as cambric or scrim, or it may be a heavier fabric. The fabric functions solely as a mutual anchorage between the foamed latex sponge layer and the upper or cover layer of the synthetic resin, and hence need have little strength or body.

The fabric is applied to the top surface of a mass of foamed latex before the foam is set and while it is still wet and very adhesive. The foamed latex hence penetrates and anchors itself into the interstices of the fabric so that when the foamed latex is set and vulcanized, numerous small roots or tentacles of the sponge rubber will be found in the meshes of the fabric, so that it is impossible to separate the fabric from the sponge rubber without tearing the sponge rubber. The showing of this has been attempted in Fig. 1, where the underside of the fabric, which is turned up at the corner, is shown with many fine particles of sponge rubber adhering to its under surface.

The outer or top layer of the product, made of a synthetic resin such as used in the manufacture of artificial leather sheets, is indicated at 3.

As set forth above, this is adhered to the upper surface of the fabric, to which it holds firmly. In Fig. 1, the outer surface of the layer is shown as decorated by embossing the sheet, but the surface may be smooth if desired.

The material shown and described herein has many uses, some of which have been set forth. It differs from known products in that the composite product holds firmly together and there is no possibility of the upper layer 3 separating from the yielding base because of the presence of the intermediate fabric layer to which the other components of the material are firmly bonded. The material is characterized by the practically inseparable bond between the upper layer 3 and the fabric 2, and the latter is in turn bonded to the sponge rubber with an adhesion which is stronger than the inherent strength of the sponge rubber, so that any effort to remove the outer layer will result in tearing the sponge rubber rather than in separation of the constituents of the product at their surfaces of contact.

While the material is described in its present best known and preferred form, the invention is capable of modification or improvement within the scope of the claims.

What is claimed is:

1. As a new product of manufacture, a flexible laminated sheet comprising a layer of foamed and vulcanized latex sponge rubber, a layer of woven fabric on a surface of the sponge rubber, and a flexible layer of a synthetic resin forming an outer wear-resisting surface which is adhered to the surface of the fabric, the sponge rubber layer being united to the fabric layer by the penetration of the sponge rubber into the meshes of the fabric.

2. As a new product of manufacture, a composite flexible sheet having therein a layer of woven fabric interposed between a flexible sheet of fused synthetic resin, and a layer of foamed latex sponge rubber, the sheet of synthetic resin being adhered to one surface of the fabric and forming an outer wear-resisting surface and the layer of sponge rubber anchored to the other surface of the fabric by the pentration of the sponge rubber into the meshes of the fabric.

ROBERT D. THOMPSON.
STERLING W. ALDERFER.
ALFRED BOSSHARD.

REFERENCES CITED

The following references are of record in the file of this patent:

UNITED STATES PATENTS

| Number | Name | Date |
|---|---|---|
| 1,352,739 | Egerton | Sept. 14, 1920 |
| 1,802,985 | Semon | Apr. 28, 1931 |
| 1,916,640 | Rubin et al. | July 4, 1933 |
| 2,130,359 | Miller | Sept. 20, 1938 |
| 2,140,026 | Murphy et al. | Dec. 13, 1938 |
| 2,163,289 | Pennel et al. | June 20, 1939 |
| 2,278,345 | Benson | Mar. 31, 1942 |
| 2,288,054 | Walton | June 30, 1942 |
| 2,430,931 | Hershberger | Nov. 18, 1947 |
| 2,439,051 | McGill | Apr. 6, 1948 |
| 2,453,052 | Van Etten | Nov. 2, 1948 |
| 2,563,478 | Mason et al. | Aug. 7, 1951 |